United States Patent [19]
Carrea et al.

[11] Patent Number: 5,985,007
[45] Date of Patent: Nov. 16, 1999

[54] NOBLE GAS PURIFIER WITH SINGLE PURIFIER VESSEL AND RECUPERATIVE HEAT EXCHANGER

[75] Inventors: Giovanni Carrea; Brian D. Warrick, both of Colorado Springs, Colo.

[73] Assignee: D.D.I. Ltd.

[21] Appl. No.: 08/854,086

[22] Filed: May 9, 1997

Related U.S. Application Data

[63] Continuation of application No. 08/505,136, Jul. 21, 1995, abandoned.

[51] Int. Cl.$^6$ .................................................. B01D 53/04
[52] U.S. Cl. ................................. 96/126; 96/132; 96/143
[58] Field of Search ........................... 95/114–120, 126, 95/127; 96/108, 121, 126, 131, 132, 143; 55/267–269

[56] References Cited

U.S. PATENT DOCUMENTS

| | | | |
|---|---|---|---|
| 2,661,808 | 12/1953 | Kahle | 95/115 |
| 2,675,089 | 4/1954 | Kahle | 95/115 |
| 3,150,942 | 9/1964 | Vasan | 95/115 |
| 3,961,897 | 6/1976 | Giorgi et al. | 96/126 X |
| 4,312,669 | 1/1982 | Boffito et al. | 75/177 |
| 4,579,723 | 4/1986 | Weltmer et al. | 423/219 |
| 4,717,551 | 1/1988 | Bernauer et al. | 95/116 X |
| 4,976,938 | 12/1990 | Knize et al. | 95/116 X |
| 5,110,569 | 5/1992 | Jain | 423/230 |
| 5,198,001 | 3/1993 | Knebel et al. | 95/126 X |
| 5,202,096 | 4/1993 | Jain | 422/190 |
| 5,238,469 | 8/1993 | Briesacher et al. | 95/115 |
| 5,489,327 | 2/1996 | Otsuka et al. | 95/116 |

FOREIGN PATENT DOCUMENTS

| | | | |
|---|---|---|---|
| 2177079 | 1/1987 | United Kingdom | 95/116 |

*Primary Examiner*—Robert Spitzer
*Attorney, Agent, or Firm*—David H. Jaffer

[57] ABSTRACT

A method and an apparatus for removing impurities from a noble gas or nitrogen utilizing a single purifier vessel having three zones. In the first zone, the gas is preheated to a temperature greater than 200° C.; in the second zone, the preheated gas is contacted with a getter material at greater than 335° C. for removal of impurities such as methane and other hydrocarbons, water, carbon monoxide, nitrogen, oxygen, and carbon dioxide; in the third zone, the gas is contacted with a second getter material at a temperature greater than 150° C. for removal of hydrogen. Hot gas exiting the purifier vessel is passed through a recuperative heat exchanger where the hot exiting gas preheats in-coming gas before it enters the first zone of the purifier vessel.

11 Claims, 7 Drawing Sheets

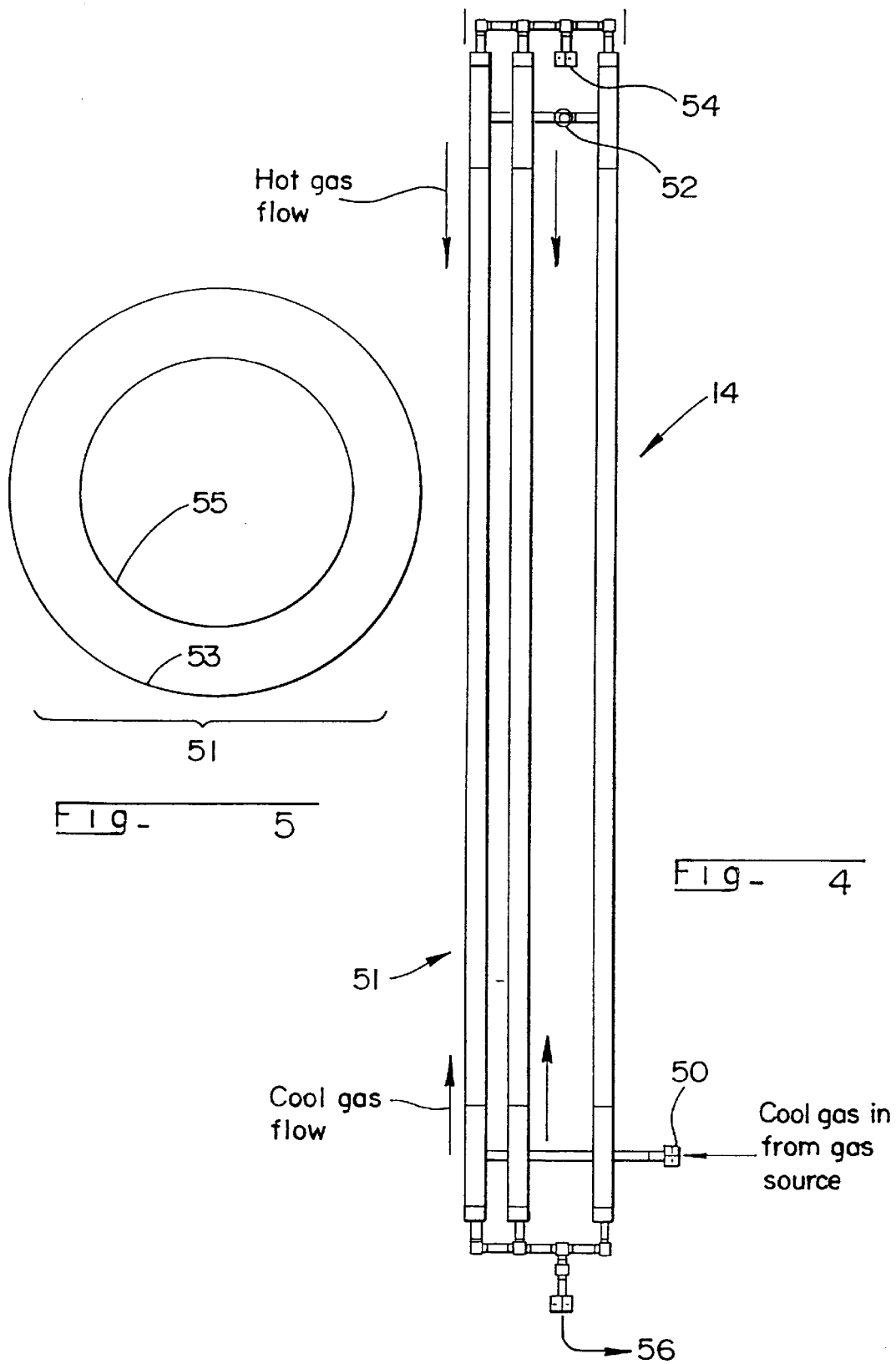

NOBLE GAS PURIFIER WITH SINGLE PURIFIER VESSEL AND RECUPERATIVE HEAT EXCHANGER

This application is a continuation of application(s) Ser. No. 08/505,136 filed on Jul. 21, 1995, now abandoned.

BACKGROUND OF THE INVENTION

1. Field of the Invention

The invention relates generally to a method and an apparatus for removal of impurities from noble gases and nitrogen. In particular, the invention relates to a method and apparatus which utilize a single purifier vessel with three temperature zones to achieve removal of contaminants below 1 part per billion (ppb). The first zone preheats in-coming gas, the second zone removes methane and other impurities, and the third zone removes hydrogen. A recuperative heat exchanger preheats in-coming gas utilizing hot gas exiting the purifier vessel.

2. Brief Description of the Prior Art

Hot getter materials have been widely used to remove impurities from noble gases and nitrogen. The getter material is typically encased in a stainless steel container maintained at a single temperature. At the temperatures at which these purifiers are operated, out gassing of hydrogen from the getter and stainless steel container may contaminate the purified gas to levels of 0.01 to more than 1 part per million (ppm). U.S. Pat. No. 5,238,469 describes a method for removal of hydrogen after other impurities are removed with hot getter materials. The impure gas is preheated to a temperature greater than 200° C. (preferably greater than 300° C.) in a first preheating vessel. The heated impure gas is then passed into a second vessel over a heated getter material (preferably at greater than 300° C.) where impurities such as methane, water, carbon monoxide, nitrogen, oxygen, and carbon dioxide are removed. The heated gas is then cooled to less than 100° C. by passing through a heat exchanger. Finally, the gas is passed through a third vessel which is filled with a sorption material with a high capacity for hydrogen. U.S. Pat. No. 5,238,469 indicates that hydrogen impurity levels in nitrogen may be reduced to less than 1 ppb using this technique. However, this technique requires use of three vessels and a heat exchanger, and requires that the gas being purified be cooled below 100° C. (and preferably to 40° C.) with the heat exchanger before hydrogen can be removed to less than 100 ppb.

Another prior art technique which has recently been used involves a single purifier vessel having two temperature zones. In the first higher temperature zone, a getter is used at about 350 to 400° C. to remove impurities such as methane, water, carbon monoxide, oxygen, and carbon dioxide. A second, lower temperature zone (200 to 250° C.) is used to remove hydrogen with a second getter suited to hydrogen removal. The impurity removal with this technique is less than 1 ppb for methane, water, carbon monoxide, oxygen, and carbon dioxide, and less than 10 ppb for hydrogen. At these levels, flow rates of only 100 SCFH can be achieved with the system described.

SUMMARY OF THE INVENTION

It is a primary object of the present invention to provide a method and an apparatus for removal of hydrogen from purified noble gases and nitrogen to levels less than 1 ppb.

It is a further object of the present invention to provide a method and an apparatus in which impurities typically found in noble gases and nitrogen (such as methane and other hydrocarbons, water, carbon monoxide, nitrogen (in noble gases), oxygen, and carbon dioxide) are removed in a first purification step at a temperature greater than 330° C. and hydrogen is removed in a second purification step at greater than 150° C.

Another object of the present invention is to provide an apparatus in which noble gases and nitrogen may be purified in a single vessel purifier, thereby minimizing the contamination from surfaces in vessels and pipes connecting vessels, reducing pressure drop in the purification system (which permits greater flows of the gas to be purified), and reducing manufacturing cost.

A further object of the present invention is to preheat gas coming into the gas purification system using a recuperative heat exchanger (preheating in-coming gas with hot gas exiting the purification vessel) and preheating zone within the purification vessel.

Still another object of the present invention is to remove hydrogen at a relatively high temperature (greater than 150° C.), which minimizes the cooling required to remove hydrogen and consequently permits higher flows of the gas to be purified.

Briefly, the preferred embodiment of the present invention is a method and an apparatus for removing impurities from a noble gas or nitrogen utilizing a single purifier vessel. In the first zone of the vessel, the gas is preheated to a temperature greater than 200° C.; in the second zone, the preheated gas is contacted with a getter material at greater than 335° C. for removal of impurities such as methane, water, carbon monoxide, nitrogen, oxygen, and carbon dioxide; in the final zone, the gas being purified is contacted with a second getter material at a temperature greater than 150° C. for removal of hydrogen. Hot gas exiting the purifier vessel is passed through a recuperative heat exchanger where the hot exiting gas preheats in-coming gas before it enters the first zone of the purifier vessel. The recuperative heat exchanger reduces the power used for gas purification, and the combination of the recuperative heat exchanger and preheat zone of the vessel allow removal of impurities at high flow rates. The pre-heating is particularly important in the removal of hydrocarbon impurities, which are efficiently removed only at relatively high temperatures (greater than 335° C., and preferably greater than 350° C.).

IN THE DRAWING

FIG. 4 is a plan view of the recuperative heat exchanger;

FIG. 5 is a cross-sectional view of one of the tubes of the recuperative heat exchanger;

Figure 6A:
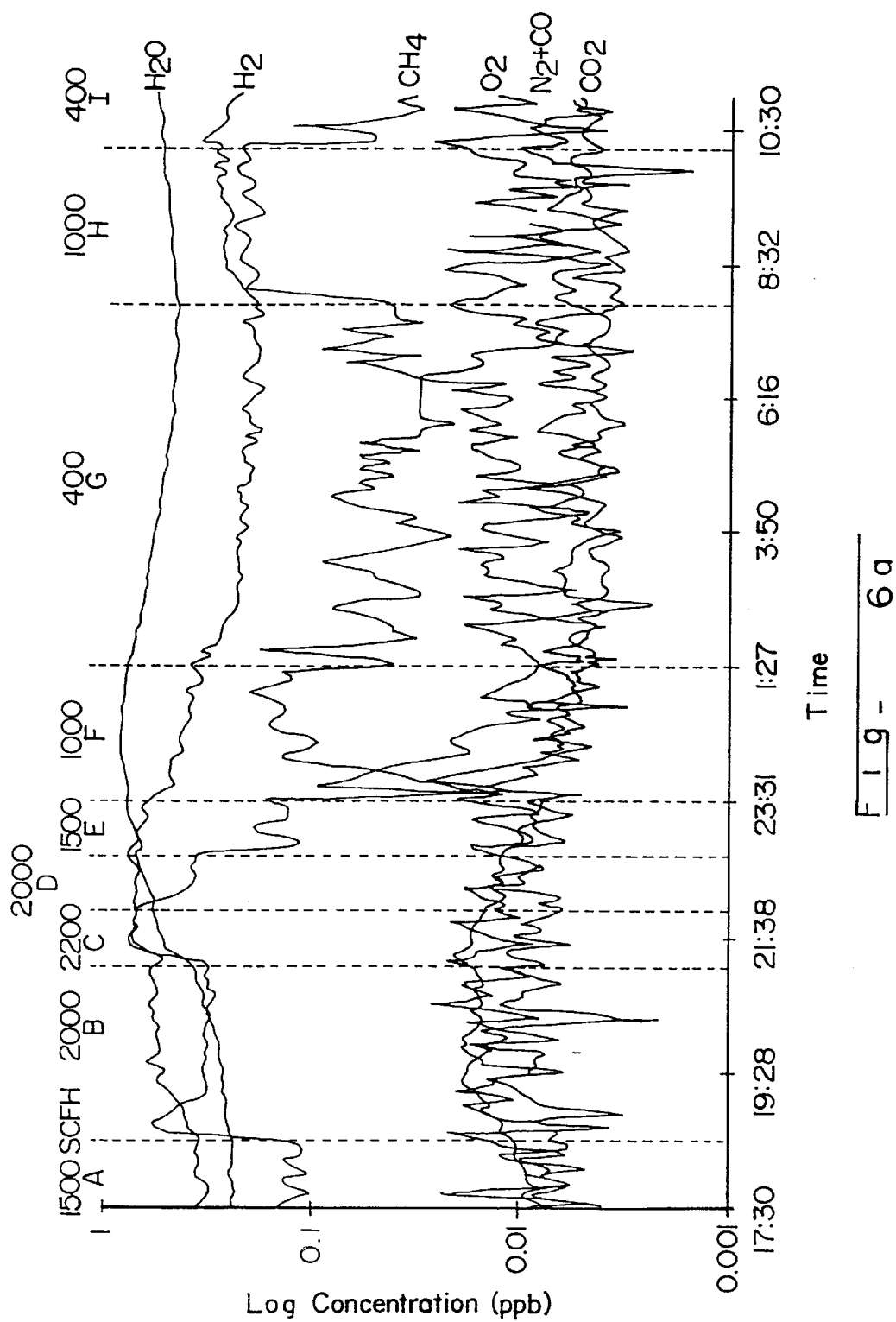
Figure 6B:
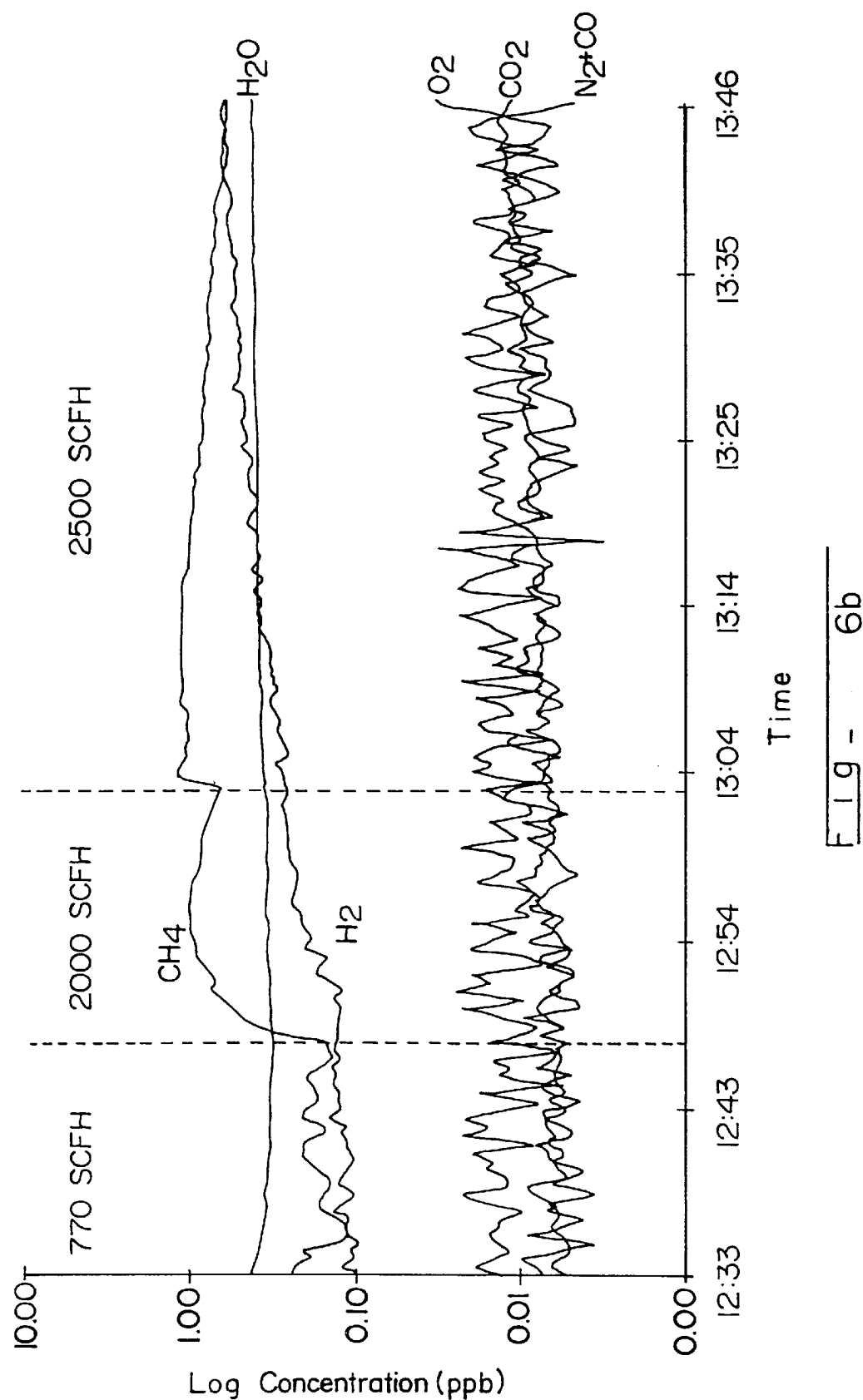
Figure 7:
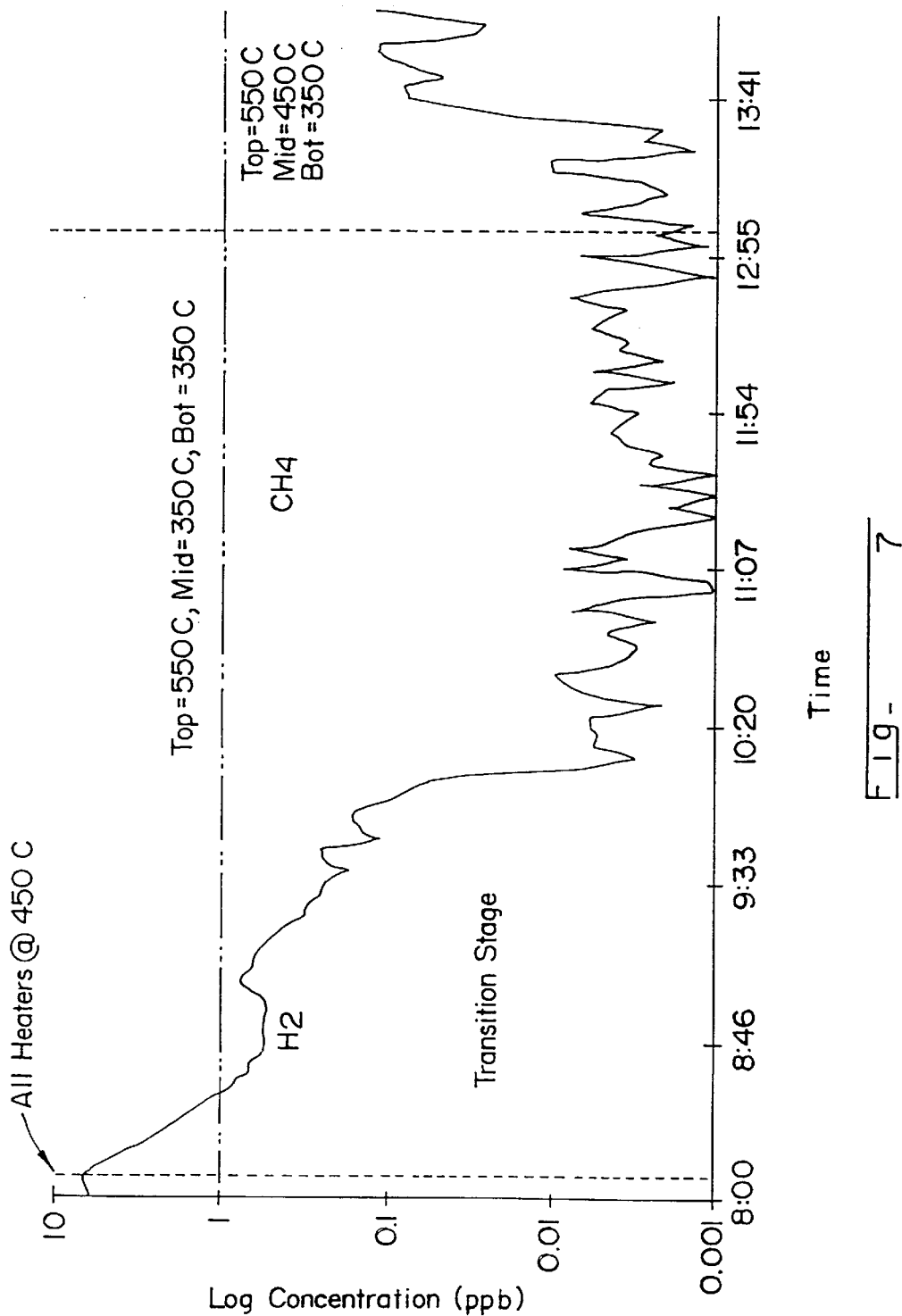

FIGS. 6(a) and 6(b) show examples of purification of argon using the present invention under different conditions and flow rates; and FIG. 7 illustrates optimization of impurity removal using the present invention.

DETAILED DESCRIPTION OF THE PREFERRED EMBODIMENT

This invention provides a method and an apparatus which remove impurities (including hydrogen) from purified noble gases and nitrogen to levels of less than 1 ppb. Hydrogen removal is accomplished at a temperature of greater than 150° C., which allows hydrogen removal to be conducted without the significant cooling. Since the gas need not be cooled to low temperatures (e.g., below 100° C.), purification and hydrogen removal can be accomplished in a single vessel, thereby minimizing contamination from vessel surfaces and connecting pipes, permitting greater flows of gas to be purified, and reducing the manufacturing cost of the vessel(s). A recuperative heat exchanger utilizing hot gas exiting from the purification vessel is preferably used to preheat in-coming gas for purification and to cool the purified gas leaving the vessel. This feature aids in accomplishing high flow rates by minimizing the heating required in the purification vessel and minimizing (or eliminating) the need for water or other fluid cooling of gas leaving the vessel. The heat exchanger and a preheating zone in the vessel facilitates removal of impurities (particularly hydrocarbons) in the heated getter bed at high flow rates.

Figure 1:
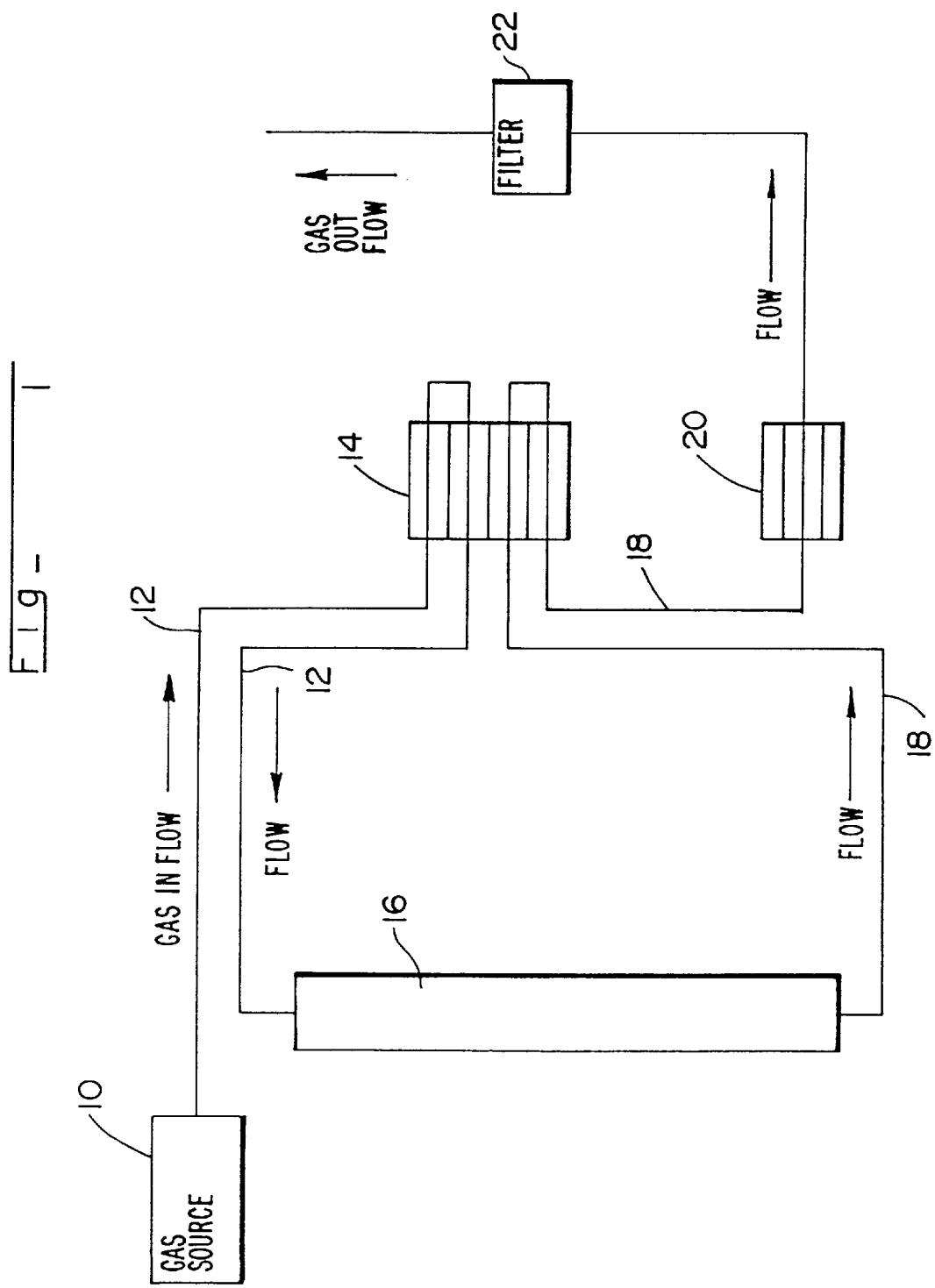
FIG. 1 is a plan view of a gas purifier system in accordance with the present invention.

With reference to FIG. 1, a gas purification system in accordance with the present invention is shown. Gas source 10 provides gas to be purified through gas in-flow tubing 12. The flow of gas is controlled with flow meters and valves which are well known in the art (not shown). The gas flows into recuperative heat exchanger 14, where it is preheated prior to entry into purifier vessel 16. The preheating is accomplished through gas flowing through out-flow tubing 18 after the gas leaves purifier vessel 16. Thus, gas exiting purifier vessel 16 is hot (as discussed further in detail below), and flows through recuperative heat exchanger 14 to heat in-coming gas. After the purified gas flows through recuperative heat exchanger 14 through out-flow tubing 18, it may optionally be passed through a secondary heat exchanger 20 to cool the gas to a lower temperature (generally about 40° C.). The flow may then be passed through a filter 22, e.g., a $0.01\mu$ filter, to remove any particles present in the gas flow. After the flow has been filtered, it may be immediately used in a process. Heat exchanger 20 may have any conventional design. Water cooling is not required with the present invention. A length of coiled stainless steel tubing enclosed in an aluminum shroud and equipped with a fan at the bottom (to prevent air from stagnating within the heat exchanger) has been found to perform well.

Figure 2:
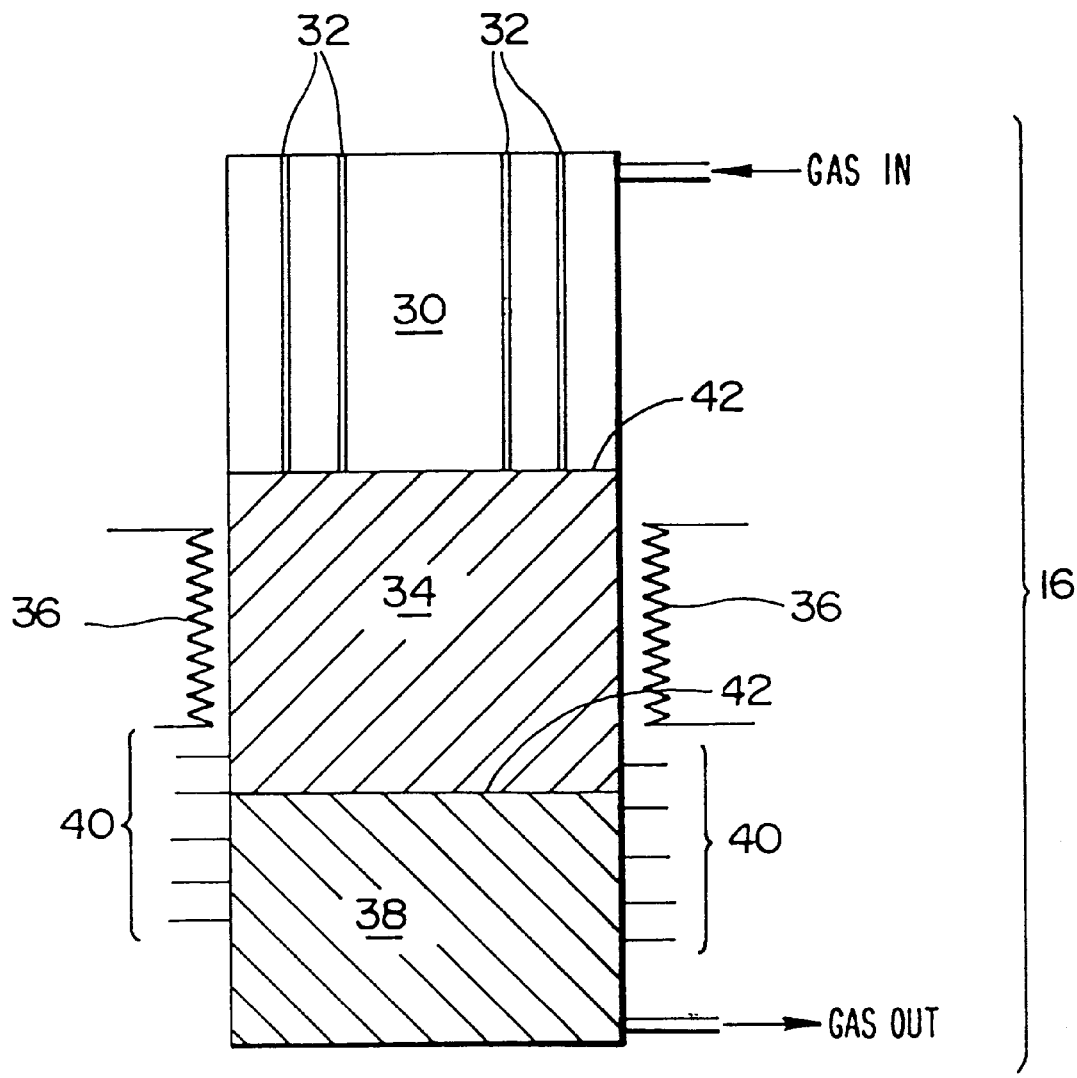
FIG. 2 is a cross-sectional view of the purification vessel.

Referring now to FIG. 2, a cross-sectional view of purification vessel 16 is shown. In a vessel designed for a gas flow of 2,000 SCFH (Standard Cubic Feet/Hour) or less, a cylindrical stainless steel vessel having a length top to bottom of 66 inches and a diameter of five inches is suitable. Larger flows may be achieved with a wider diameter vessel, for example, a 7½" diameter vessel with a height of 66" may be used to achieve flows of up to 3000 SCFH. The gas to be purified enters purifier vessel 16 after preheating in recuperative heat exchanger 14, which is described in more detail below. Purifier vessel 16 is separated into three different temperature zones (30, 34, 38) with the use of heaters (32, 36) located near the top of the vessel, and a heat sink (preferably cooling fins) 40 near the outlet of the purifier. In the preferred embodiment internal rod heaters 32 are used in zone 30 (the preheat zone), and a band heater 36 is used in zone 34 (the high temperature getter zone). Rod heaters 32 provide more uniform heating and less heat loss in zone 30, but a less expensive external band heater could be substituted for the rod heaters. The disadvantages of external heaters are that they are less efficient and that more heat is lost to the ambient, which may create problems in closed spaces. Heaters 32 and 36 and cooling fins 40 are used to maintain a strong temperature gradient in the purifier vessel, allowing optimum hydrocarbon removal in the upper (high temperature) part 34 of vessel 16, and optimum hydrogen removal in the lower (low temperature) part 38 of vessel 16. Fine screens 42 composed of porous scintered metal (preferably stainless steel) may separate the three zones of vessel 16.

Preheat zone 30 contains no getter material. The heaters in this region are preferably maintained at a temperature of approximately 500 to 550° C. by heater 32, causing in-coming gas (which enters at about 200° C. from recuperative heat exchanger 14) to be heated to 450–550° C. A nozzle arrangement may be used to distribute in-coming gas more evenly in preheat zone 30. High temperature purification zone 34 is filled with a getter material which facilitates the removal of methane, water, carbon monoxide, nitrogen, oxygen, and carbon dioxide to less than 1 ppb in a noble gas. A zirconium/vanadium alloy (such as Alloys 4–8 in Table 1) is preferred for noble gases, but other acceptable getters (such as zirconium-iron alloys) are well known.

TABLE 1

| Alloy ID | Weight Percent | | | | | |
|---|---|---|---|---|---|---|
| | Al | Ti | V | Fe | Zr | Ni |
| 1 | 13.8 | — | — | — | 86.2 | — |
| 2 | 13.7 | — | — | — | 86.3 | — |
| 3 | — | — | — | 26.4 | 73.6 | — |
| 4 | — | — | 1.8 | 29.0 | 69.2 | — |
| 5 | 1.9 | — | 28.1 | 4.4 | 65.6 | — |
| 6 | — | 6.8 | 26.3 | 9.9 | 57.0 | — |
| 7 | 1.7 | 18.1 | 19.5 | 19.0 | 41.7 | — |
| 8 | 1.5 | 13.1 | 21.2 | 15.3 | 48.9 | — |
| 9 | 1.1 | 89.0 | — | 6.0 | — | 3.9 |
| 10 | 1.8 | 64.0 | — | 10.8 | — | 23.4 |

When nitrogen is being purified, zirconium-iron, zirconium-nickel, titanium-iron and titanium-nickel alloys are preferred (such as Alloys 3, 9, and 10 in Table 1). Zirconium-iron-vanadium alloys, such as alloys 4 to 8 in Table 1, are acceptable, but may react violently with the nitrogen. In addition, when nitrogen is being purified, it is preferable to nitride the alloy prior to use and thereby avoid potentially dangerous exothermic nitriding in the purifier vessel during operation of the purifier.

Returning to the example of purification of a noble gas, with a five inch diameter vessel, about 20 kg of an alloy such as Table 1's Alloy 4 getter may be used. Second heater 36 is used to maintain a temperature of at least 335° C. in high temperature purification zone 34. This temperature is required to remove methane and other organic impurities from the gas stream to less than 1 ppb. The preferred minimum internal temperature in zone 34 is approximately 350–375° C. The preheating of the in-coming gas to 450 to 550° C. in the recuperative heat exchanger and preheat zone 30 ensures that the organic impurities are effectively removed throughout the total depth of the getter in zone 34. The getter material is in the form of pills and typically has a size on the order of 6 mm diameter and 4 mm thick.

At the temperatures over 335° C. used to remove impurities in zone 34, hydrogen is easily out-gassed from the getter and stainless steel vessel 16. Therefore, hydrogen purification zone 38 is used to provide hydrogen removal from the gas stream. The temperature in hydrogen purification zone 38 is maintained at 150–300° C., and preferably at approximately 250° C. Excellent hydrogen removal is achieved at 250° C. even at high gas flow rates. However, note that a temperature of less than 250° C. will cause hydrogen to be removed to lower concentration levels and/or will lengthen the effective life of the getter used in zone 38, but more gas cooling will be required.

In a vessel for relatively low gas flows (less than 1,000 SCFH in a vessel of length 66 inches and five inch diameter), we have found that external cooling of hydrogen purification zone 38 with a heat sink or fluid cooling is not required. Sufficient cooling is attained by heat dissipated from the unheated exterior of vessel 16. In fact, an external heater can be attached to zone 38. When gas is being purified, the heater is not used and serves as a heat sink. When the getter in zone 38 reaches a level of hydrogen sorption that is too high for the gas purity levels needed, the heater can be turned on, thereby regenerating the getter by driving off the absorbed hydrogen.

In vessels where the gas flow rate is higher, aluminum cooling fins 40 may be used as a heat sink to insure that an appropriate heat gradient exists between high temperature purification zone 34 and hydrogen purification zone 38. Alternatively, fluid cooling may be used. However, fluid cooling adds unnecessary complexity and is not required by the present design. In addition, in larger vessels or very high flow designs, a cooling zone may be added within vessel 16 between high temperature purification zone 34 and hydrogen purification zone 38. In such designs, the exterior of vessel 16 at the cooling zone and hydrogen purification zone 38 would have a heat sink such as fins 40 or fluid cooling. The cooling zone can simply be an empty portion of vessel 16 between the getter material in zones 34 and 38, or could be constructed with baffling to obtain more cooling in a shorter distance. The trade-off in using baffling is reduced flow rates but greater cooling in a given cooling zone length.

Any hydrogen sorbant material may be used in zone 38. At the 150–300° C. temperatures used in zone 38, an alloy of zirconium and aluminum is preferably used because of its high capacity for hydrogen sorption (such as Alloys 1 and 2 in Table 1). This alloy has one of the lowest hydrogen equilibrium pressures of any common zirconium alloy. However, other suitable alloys, such as any titanium or zirconium alloy, may be used. In zone 38, about 5 to 10 kg of the zirconium-aluminum alloy is used in a five-inch diameter vessel. The use of this relatively high quantity of hydrogen getter allows hydrogen to be effectively removed at high flow rates and relatively high temperature.

A key to the very effective hydrogen removal of this method is that the hydrogen equilibrium pressure in the zirconium-aluminum alloy in zone 38 at 250° C. is three orders of magnitude less than the hydrogen equilibrium pressure of the zirconium/titanium/vanadium/iron alloy used in high temperature purification zone 34 at 350° C. Therefore, if 1 ppm of hydrogen is present from the alloy in high temperature purification zone 34, it will be removed to 1 ppb with the zirconium-aluminum alloy in hydrogen purification zone 38.

Figure 3:
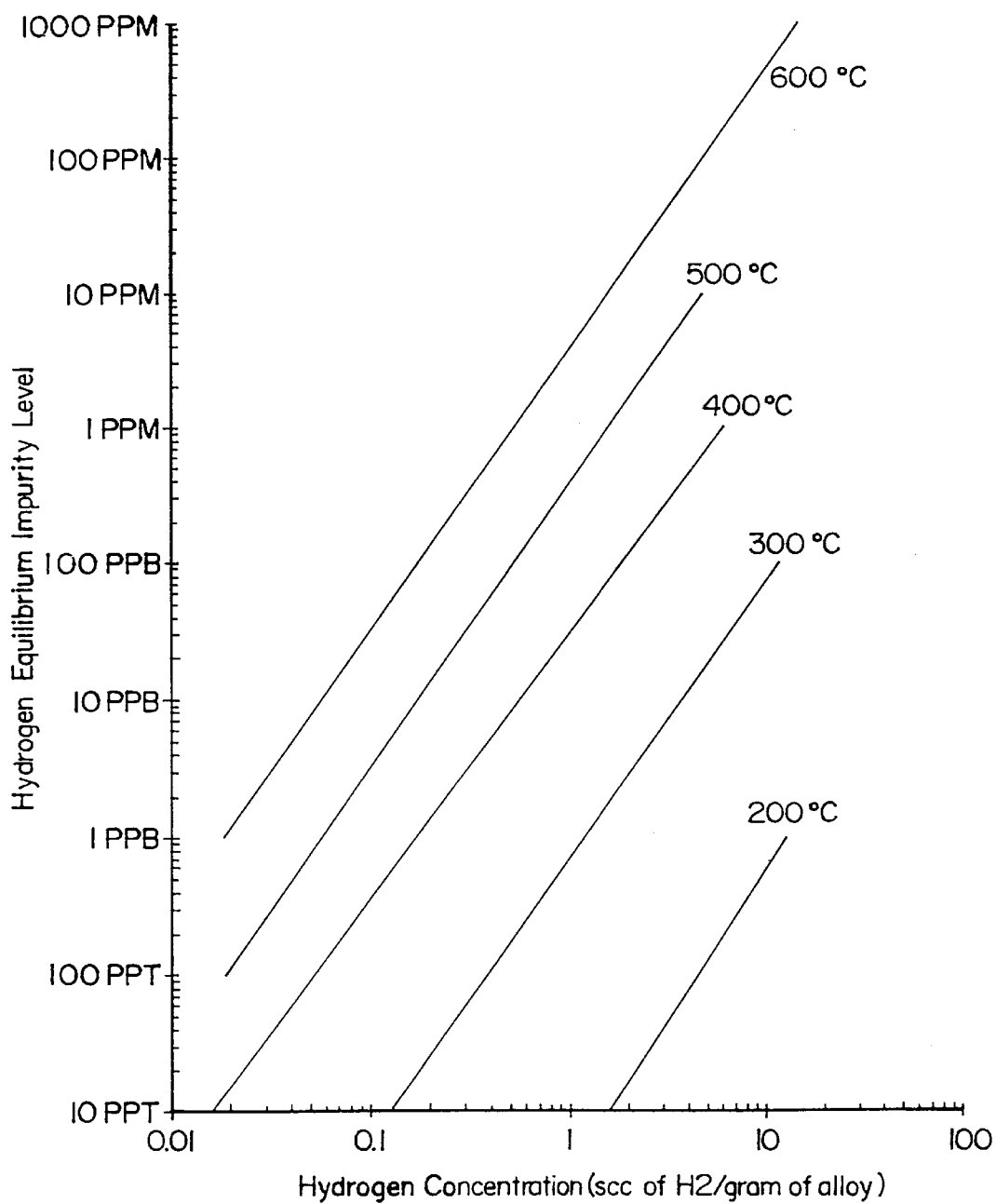
FIG. 3 illustrates the dependence of typical hydrogen equilibrium pressures for zirconium alloys on temperature.

While the alloys just described are preferred and the specific alloys chosen depend on the contaminants to be removed and temperatures used, this principal of using a temperature gradient between the two getter zones is general for the alloy materials described above, as the hydrogen equilibrium pressures for alloys are several orders of magnitude lower at lower temperatures. FIG. 3 illustrates hydrogen equilibrium pressures for a typical zirconium alloy at different temperatures. When two temperature zones are used, the higher temperature zone removes most contaminants (e.g. methane, water, carbon monoxide, carbon dioxide, and oxygen), and the following lower temperature zone removes hydrogen which may out-gas in the high temperature zone from the vessel or the high temperature zone getter material. Operation of a high temperature purification zone to extract most contaminants (particularly organics such as methane) followed by lower temperature zone to remove hydrogen results in the noble gas or nitrogen purified to levels below 1 ppb. Higher removal of hydrogen may be achieved if required by further cooling the alloy in zone 38 (e.g. at 150° C., the equilibrium is about four orders of magnitude lower).

When hydrogen purification zone 38 contains getter at approximately 250° C., the gas exits vessel 16 at a temperature of approximately 200° C. (exit temperatures of course depend on flow rate and the temperatures to which each of the zones of the purification vessel is heated). It then enters recuperative heat exchanger 14.

FIG. 4 is a plan view of recuperative heat exchanger 14. Recuperative heat exchanger 14 preheats gas entering purification vessel 16, and cools gas exiting the purification vessel. Preheating of in-coming impure gas reduces the amount of heating required in pre-heat zone 30 of vessel 16, and cooling of purified gas exiting from hydrogen purification zone 38 of vessel 16 avoids the necessity of water or other fluid cooling for gas exiting vessel 16. Both of these features aid in achieving high flow rates for the gas to be purified, as both heating and cooling the gas as performed in the prior art result in pressure drops and consequent reduction in the achievable flow rate. The recuperative heat exchanger also reduces the power used for heating the gas prior to purification.

FIGS. 4 and 5 illustrate the operation of recuperative heat exchanger 14. The body of heat exchanger 14 is primarily comprised of an array of pipes 51 of stainless steel. Each pipe 51 has a concentric design, with an outer pipe 53 (preferred diameter 1 to 2 inches, preferred length about 51 inches) and an inner pipe 55 (diameter of approximately one-half to one inch). In the preferred embodiment, in-coming cool gas flows through the outer pipes and hot gas flows through the inner pipes, and in the opposite direction (counterflow). This maximizes heat transfer to the in-coming cool gas and reduces heat loss to the ambient. Thus, cool impure gas from the gas source enters heat exchanger 14 through an inlet port 50 and flows through outer pipes 53 of the array. Outlet port 52 connects exchanger 14 to purification vessel 16. Hot purified gas exiting vessel 16 re-enters exchanger 14 at port 54. The hot gas, which in the example described is at approximately 200° C. exiting vessel 16, flows through inner pipes 55 of the array. As the hot gas flows through the inner pipe 55, it is cooled by heat transfer to the cool gas, which is flowing in the opposite direction in pipe 53. Thus, cool gas entering at 50 reaches a temperature of about 150–175° C. by the time it reaches 52 (prior to entry to vessel 16), and hot gas entering from vessel 16 at 54 is cooled to about 100° C. when it leaves exchanger 14 at 56. As noted in the discussion of FIG. 1, a secondary heat exchanger 20 may be used to further cool the gas to about 40° C. As noted above, the temperatures for gas reaching 52 (prior to entry to vessel 16) will depend on the temperature of gas leaving the vessel, which depends on the flow rates used and the temperatures at which the vessel is operated. The utility of the recuperative heat exchanger rests in the efficiency obtained by pre-heating gas before it reaches zone 30 of vessel 16 (so that heating requirements in zone 30 are reduced), and using the gas exiting the vessel for this pre-heating (which both pre-heats gas entering the vessel and cools gas exiting the vessel).

Referring now to FIG. 6(a), the ability of a purifier of the design described above to remove all impurity species to less than 1 ppb with flow rates ranging from 400 SCFH to 2200 SCFH is shown. This data was obtained with a purifier of the dimensions described above, with the preferred alloys specified above. External heaters were applied with the skin temperature of the vessel at 500–600° C. in pre-heat zone 30, at 300–400° C. in high temperature zone 34, and with no heaters at lower temperature zone 38. The approximate internal temperatures of the gas in these zones were 250–400° C. in zone 30, 300–400° C. in zone 34, and 150–250° C. in zone 38. As discussed above, the temperatures of the gas will depend on the flow rate.

FIG. 6(b) shows impurity levels in argon after purification using the design described above when flows increase from a moderate flow (770 SCFH), with flow exceeding the designed maximum flow rate of 1700 SCFH over a short period of time. Initially, methane levels increase as flow is increased, but the levels come down as flow and pressure stabilize.

FIG. 7 illustrates optimization of impurity removal using the present invention, with key data summarized in Table 2. The data shown in FIG. 7 initially (left hand side) is obtained with each of the three zones of vessel 16 externally heated to 450° C. At this temperature, relatively high levels of hydrogen remain in the gas. The hydrogen out-gassed from the purifier at 450° C. is about 6.5 parts per billion with excellent methane removal. The temperature is then modified to provide a gradient across the two getter zones of the vessel. As the external temperature for middle zone 34 and bottom zone 38 drops to 350° C., the hydrogen level drops to less than ten parts per trillion, but the methane level climbs to 210 parts per trillion. When the top (pre-heat) zone 30 is heated to a skin temperature of 550° C., the middle zone 34 is heated to a skin temperature of 450° C., and the bottom temperature zone 38 is heated to a skin temperature of 350° C., the hydrogen level remains quite low (80 parts per trillion) and the methane level is also very low (60 parts per trillion).

TABLE 2

HYDROGEN AND METHANE OUTLET IMPURITY LEVELS AS A FUNCTION OF HEATER TEMPERATURE

| | HEATER TEMPERATURES (C) | | | HYDROGEN IMPURITY | METHANE IMPURITY |
| --- | --- | --- | --- | --- | --- |
| | TOP | MIDDLE | BOTTOM | LEVEL (PPB) | LEVEL (PPB) |
| A | 450 | 450 | 450 | 6.5 | <0.01 |
| B | 550 | 350 | 350 | <0.01 | 0.21 |
| C | 550 | 450 | 350 | 0.08 | 0.06 |

As is apparent from FIG. 7 and Table 2, performance of the purifier can be optimized depending on the system requirements. The last zone shown in FIG. 7 provides impurity levels at less than 0.1 ppb. If even higher removal is required, the getter in the high temperature zone can be run at a higher temperature to remove methane, with cooling of the low temperature zone to a lower temperature for hydrogen removal to lower levels. If these extremely low levels are required (on the order of 10 parts per trillion), a cooling zone between zone 34 and zone 38 may be desired.

In the example described above, the temperatures are external skin temperatures of the vessel. The actual temperature of the gas inside the vessel will depend on flow rates. For example, while the skin temperature in the pre-heat zone may be 550° C., if the incoming gas is at around 150° C. to 175° C., the incoming gas will be heated to approximately 250° C. to 350° C. in the pre-heat zone. If the getter in zone 34 is heated to 450° C., the gas passing through the getter will be heated to approximately 350° C. to 400° C. If the temperature in the zone 38 is at 350° C. on the skin, the temperature of the gas will be approximately 350° C. to 375° C. As noted above, the temperatures in each zone may be adjusted to optimize the removal of impurities and at the flow rates desired.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An apparatus for removing impurities from a noble gas or nitrogen utilizing a single purifier vessel and a recuperative heat exchanger, comprising:
    (a) a gas entrance port for entry of the gas to be purified into the vessel;
    (b) a first zone of the vessel having first heater means for temperature control, where the gas entering from the gas entrance port is preheated to a temperature greater than 150° C.;
    (c) a second zone of the vessel having second heater mean for temperature control, where the preheated gas is contacted with a getter material at greater than 335° C. for removal of impurities;
    (d) a third zone of the vessel having heat reduction means for temperature control, where the gas is contacted with a getter material at a temperature greater than 150° C. for removal of hydrogen;
    (e) a gas exit port for exit of the gas from the vessel; and
    (f) a recuperative heat exchanger having a first gas flow channel connected to the gas entrance port for flow of gas to be purified to the vessel and having a second gas flow channel connected to the gas exit port for flow of gas from the vessel, at least a portion of the channels aligned in proximity to each other, whereby hot gas exiting the vessel preheats in-coming gas by thermal transfer before the in-coming gas enters the first zone of the vessel.

2. The apparatus of claim 1, wherein (a) the first gas flow channel of the recuperative heat exchanger, for flow of gas to be purified to the vessel, and (b) the second gas flow channel of the recuperative heat exchanger, for flow of gas from the vessel, comprise concentric pipes.

3. The apparatus of claim 2, wherein the second gas flow channel is contained in the inner of the concentric pipes.

4. The apparatus of claim 3, wherein the gas in the first gas flow channel and the gas in the second gas flow channel flow in opposite directions.

5. The apparatus of claim 2, wherein the gas in the first gas flow channel and the gas in the second gas flow channel flow in opposite directions.

6. The apparatus of claim 2, wherein the gas is preheated to at least 250° C. in the first zone of the vessel, the preheated gas is contacted with the getter material in the second zone at a temperature of at least 350° C., and the gas is contacted with the getter material in the third zone of the vessel at a temperature of at least 200° C.

7. The apparatus of claim 1, wherein the gas is preheated to at least 250° C. in the first zone of the vessel, the preheated gas is contacted with the getter material in the second zone at a temperature of at least 350° C., and the gas is contacted with the getter material in the third zone of the vessel at a temperature of at least 200° C.

8. The apparatus of claim 1 further comprising means for passing the flow of gas to be purified and the flow of gas from the vessel through the recuperative heat exchanger and the vessel at a flow rate of at least 400 SCFH.

9. The apparatus of claim 1, wherein the getter material in the second zone comprises at least a material selected from the group consisting of zirconium, titanium, alloys including zirconium, and alloys including titanium.

10. The apparatus of claim 9, wherein the getter material in the third zone comprises at least a zirconium-aluminum alloy.

11. The apparatus of claim 10, wherein the getter material in the second zone comprises at least a material selected from the group consisting of alloys including zirconium-vanadium, zirconium-iron, zirconium-nickel, titanium-iron, and titanium-nickel.

* * * * *